UNITED STATES PATENT OFFICE.

EDWARD D. KENDALL, OF BROOKLYN, NEW YORK, ASSIGNOR OF ONE-HALF TO EDWARD N. DICKERSON, OF STOVALL, NORTH CAROLINA, AND ONE-FOURTH TO EMMET R. OLCOTT, OF NEW YORK, N. Y.

PROCESS OF PRODUCING TUNGSTEN STEELS.

No. 795,517.     Specification of Letters Patent.     Patented July 25, 1905.

Application filed May 31, 1905. Serial No. 263,093.

*To all whom it may concern:*

Be it known that I, EDWARD D. KENDALL, a citizen of the United States, residing in the borough of Brooklyn, county of Kings, and State of New York, have invented certain new and useful Improvements in Processes of Producing Tungsten Steels, of which the following is a specification.

My invention relates to processes for the production of steel or steels containing the metal tungsten; and the object of my invention is to produce an alloy or alloys containing the metals tungsten and iron in order to obtain a tungsten steel or tungsten steels that shall be free or comparatively free from carbon, accomplishing this by reducing tungsten ore or ores with metallic zinc and alloying the reduced metallic tungsten with variable proportions of iron, preferably by one operation, in an electric furnace.

In carrying out my invention I prefer to use concentrates of tungsten ore or ores, (other and objectionable ore or ores and the gangue having been separated.) These tungsten concentrates should be granulated or powdered and mixed with metallic zinc, which also should be granulated or in the form of powder—for example, so-called "zinc-dust," a cheap by-product in zinc metallurgy. This mixture should be placed in any of the well-known and suitable forms of electric furnaces and fragments of iron, preferably free or nearly free from carbon, bedded therein and equally or regularly distributed throughout the said mixture. When it is desired to increase the proportionate quantity of iron, the mixture may also be covered with a layer of fragmental iron, with or without the addition of powdered borax or other suitable flux. The mass consisting of tungsten ore, zinc, and iron being so placed and arranged in such a furnace is to be subjected to the thermal action of a suitable and suitably-regulated electric current. In some instances, particularly in producing small quantities of the said tungsten steel, the tungsten ore and zinc in intimate mixture may first be subjected to a sufficient heat for the reduction of the one without excessive volatilization of zinc, the iron then added, and the temperature raised by increased electric energy.

Zinc oxid having commercial value, the escaping fumes of the zinc oxid which is formed in my process may be collected by any of the well-known means, such as condensing-chambers or fume-bags or water-spray vessels.

In preparing the above-described mixture of tungsten ore, zinc, and iron the relative quantities of these constituents may be varied within wide limits without departing from my invention.

To produce a tungsten steel containing, approximately, ninety-three pounds of iron and seven pounds of tungsten, a quantity of tungsten ore carrying about eight and three-quarters pounds of tungstic oxid ($WO_3$) should be reduced with about seven and one-half pounds of zinc, using the quantity of iron mentioned. With tungsten ores carrying iron or manganese (in the latter instance the resulting tungsten steel would contain some manganese) or both of these metals an additional allowance of zinc may be made proportionate to the oxygen associated with iron or manganese in the ore and the resulting iron or manganese allowed for to an extent determined by experience in proportioning the iron for the desired alloy or steel.

What I claim as my invention, and desire to secure by Letters Patent, is—

The process of producing an alloy or alloys containing tungsten and iron by preparing a mixture of tungsten ore, metallic zinc and iron and subjecting the said mixture to the thermal action of an electric current, in an electric furnace, substantially as described.

In testimony whereof I have signed this specification in the presence of two subscribing witnesses.

EDWARD D. KENDALL.

Witnesses:
    GEO. W. JAEKEL,
    HERMAN MORRIS.